United States Patent
Liu et al.

(10) Patent No.: US 7,890,325 B2
(45) Date of Patent: Feb. 15, 2011

(54) SUBWORD UNIT POSTERIOR PROBABILITY FOR MEASURING CONFIDENCE

(75) Inventors: Peng Liu, Beijing (CN); Ye Tian, Redmond, WA (US); Jian-Lai Zhou, Beijing (CN); Frank Kao-Ping K. Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1115 days.

(21) Appl. No.: 11/376,803

(22) Filed: Mar. 16, 2006

(65) Prior Publication Data

US 2007/0219797 A1    Sep. 20, 2007

(51) Int. Cl.
*G06F 17/27* (2006.01)
*G10L 15/00* (2006.01)
*G10L 15/28* (2006.01)

(52) U.S. Cl. ............................. 704/240; 704/9; 704/10; 704/231; 704/255

(58) Field of Classification Search ................. 704/240
See application file for complete search history.

(56) References Cited

U.S. PATENT DOCUMENTS

| | | | | |
|---|---|---|---|---|
| 5,477,451 A * | 12/1995 | Brown et al. | ..................... | 704/9 |
| 5,640,490 A * | 6/1997 | Hansen et al. | ............... | 704/254 |
| 5,768,603 A * | 6/1998 | Brown et al. | ..................... | 704/9 |
| 5,805,832 A * | 9/1998 | Brown et al. | ..................... | 711/1 |
| 6,442,524 B1 * | 8/2002 | Ecker et al. | .................. | 704/277 |
| 6,662,158 B1 * | 12/2003 | Hon et al. | .................... | 704/252 |
| 6,687,339 B2 * | 2/2004 | Martin | ..................... | 379/88.14 |
| 6,694,296 B1 * | 2/2004 | Alleva et al. | ................. | 704/255 |
| 7,149,688 B2 * | 12/2006 | Schalkwyk | .................. | 704/255 |
| 7,401,019 B2 * | 7/2008 | Seide et al. | ................... | 704/254 |
| 7,447,635 B1 * | 11/2008 | Konopka et al. | ................ | 704/9 |
| 2002/0116190 A1 * | 8/2002 | Rockenbeck et al. | ......... | 704/250 |
| 2002/0198713 A1 * | 12/2002 | Franz et al. | .................. | 704/252 |
| 2005/0159953 A1 * | 7/2005 | Seide et al. | ................... | 704/254 |
| 2007/0033002 A1 * | 2/2007 | Dymetman et al. | ............. | 704/5 |
| 2008/0059188 A1 * | 3/2008 | Konopka et al. | ............. | 704/257 |

OTHER PUBLICATIONS

H. Jiang. "Confidence measures for speech recognition: a survey", *Speech Communication*, 45(4): 455-470, 2005.

M. C. Benitez, A. Rubio and A. Torre, "Different confidence measures for word verification in speech recognition", *Speech Communication*, 32(1-2):79-94, 2000.

R. C. Rose, B.-H. Juang and C.-H. Lee, "A training procedure for verifying string hypothesis in continuous speech recognition", *Proc. ICASSP 1995*: 281-284, 1995.

(Continued)

*Primary Examiner*—David R. Hudspeth
*Assistant Examiner*—Justin W Rider
(74) *Attorney, Agent, or Firm*—Steven M. Koehler; Westman, Champlin & Kelly, P.A.

(57) ABSTRACT

Speech recognition such as command and control speech recognition generally use a context free grammar to constrain the decoding process. Word or subword background model are constructed to repopulate dynamic hypothesis space, especially when word spareness is at issue. The background models can be later used in speech recognition. During speech recognition, background and conventional context free grammar decoding are used to measure confidence. The discussion above is merely provided for general background information and is not intended to be used as an aid in determining the scope of the claimed subject matter.

10 Claims, 7 Drawing Sheets

OTHER PUBLICATIONS

F. Wessel, R. Schluter, K. Macherey and H. Ney, "Confidence measures for large vocabulary continuous speech recognition", *IEEE Trans. Speech and Audio Proc.*, 9(3):288-298, 2001.

Use of Acoustic Prior Informatin for Confidence Measure in ASR Applications (2001) Erhan Mengusoglu, Christophe Ris, Eurospeech 2001, Scandinavia.

S. J. Young, N. H. Russell and J. H. S. Thornton, *Token passing: a simple conceptual model for connected speech recognition systems*, Technical Report, Dept. Engineering, Cambride University, Jul. 31, 1989.

W. K. Lo, F. K. Soong and S. Nakamura, "Generalized posterior probability for minimizing verification errors at subword, word and sentence levels", *Proc. ISCSLP 2004*:13-16, Hong Kong, Dec. 2004.

C.H.Lee, "Statistical Confidence Measures And Their Applications", *Proc. ICSP 2001*, Daejeon, Korea, Aug. 2001.

* cited by examiner

SUBWORD UNIT POSTERIOR PROBABILITY FOR MEASURING CONFIDENCE

BACKGROUND

Speech recognition is the process by which computers interpret acoustic patterns in human speech. Generally, there are two types of speech recognition. The first type is often called "dictation speech recognition." With dictation speech recognition, a user's speech can include a continuous stream of spoken words that are each recognized and converted to text. Dictation speech recognition is often used for applications such as medical transcription, legal and business dictation, and general word processing.

The second type of speech recognition is commonly called "command and control speech recognition." Command and control speech recognition systems are often integrated into larger systems such as personal computers, mobile phones, call-routing systems, or interactive data retrieval systems such as travel information systems. Generally, such systems perform speech recognition in order to cause the larger system to perform functions and actions in response to the user's speech. Thus, recognition of the user's spoken words or utterance, "Open Netscape" or "Call Bill Gates" would cause the larger system to do just that.

For such applications, it is important for these speech recognition systems to reliably detect and reject the Out-Of-Vocabulary (OOV) words and "misrecognized" in-vocabulary words. An OOV word is a word spoken by the user that is not in the list of words, lexicon, or vocabulary that can be recognized by the system. A misrecognized word is a word within the vocabulary or "in-vocabulary" that is recognized incorrectly. Misrecognition can be caused, for example, by background noise or a user's speaking style or accent.

Generally, command and control speech recognition systems search the user's utterance in order to identify or select words that are most likely to be specific command and control words. However, OOV or misrecognized words can cause the speech recognition system to output an erroneous command. This erroneous command causes the larger system to perform actions and functions not intended by the user. Thus, it is important for speech recognition systems, to reliably detect OOV words and misrecognized words for rejection.

Various confidence measures have been proposed to measure recognition reliability. Generally, confidence measures are some measure of probability that a word has been recognized correctly. Often, a word is only recognized when its corresponding confidence measure exceeds a particular threshold or probability value. Thus, confidence measures and thresholds are designed to increase the reliability of the speech recognition system.

Some methods of measuring confidence rely on posterior probability. Posterior probability can be viewed as a revised probability obtained by updating a prior probability after receiving new information. Word graph-based and analogous methods are often used to estimate posterior probability. However, for some Context Free Grammar or "CFG"-based applications, such as command and control speech recognition, the word graph generated by the speech decoder can be too sparse for reliable posterior probability computation.

With a sparse word graph, the best or most probable path can become dominating, thereby causing an artificially high posterior probability estimate regardless of correctness. This artificially high posterior probability score can result in OOV and misrecognized words escaping detection and rejection.

The discussion above is merely provided for general background information and is not intended to be used as an aid in determining the scope of the claimed subject matter.

SUMMARY

Subword units such as phonemes and syllables are used to construct one or more background models for later use in speech recognition. Background models can be constructed in one language for monolingual speech recognition or in more than one natural language for bilingual or multi-lingual speech recognition. The background models can be used to generate subword graphs that can be used in conjunction with conventional word graphs to improve computation of posterior probabilities and/or confidence measures.

The above Summary is provided to introduce a selection of concepts in a simplified form that are further described below in the Detailed Description. The above Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
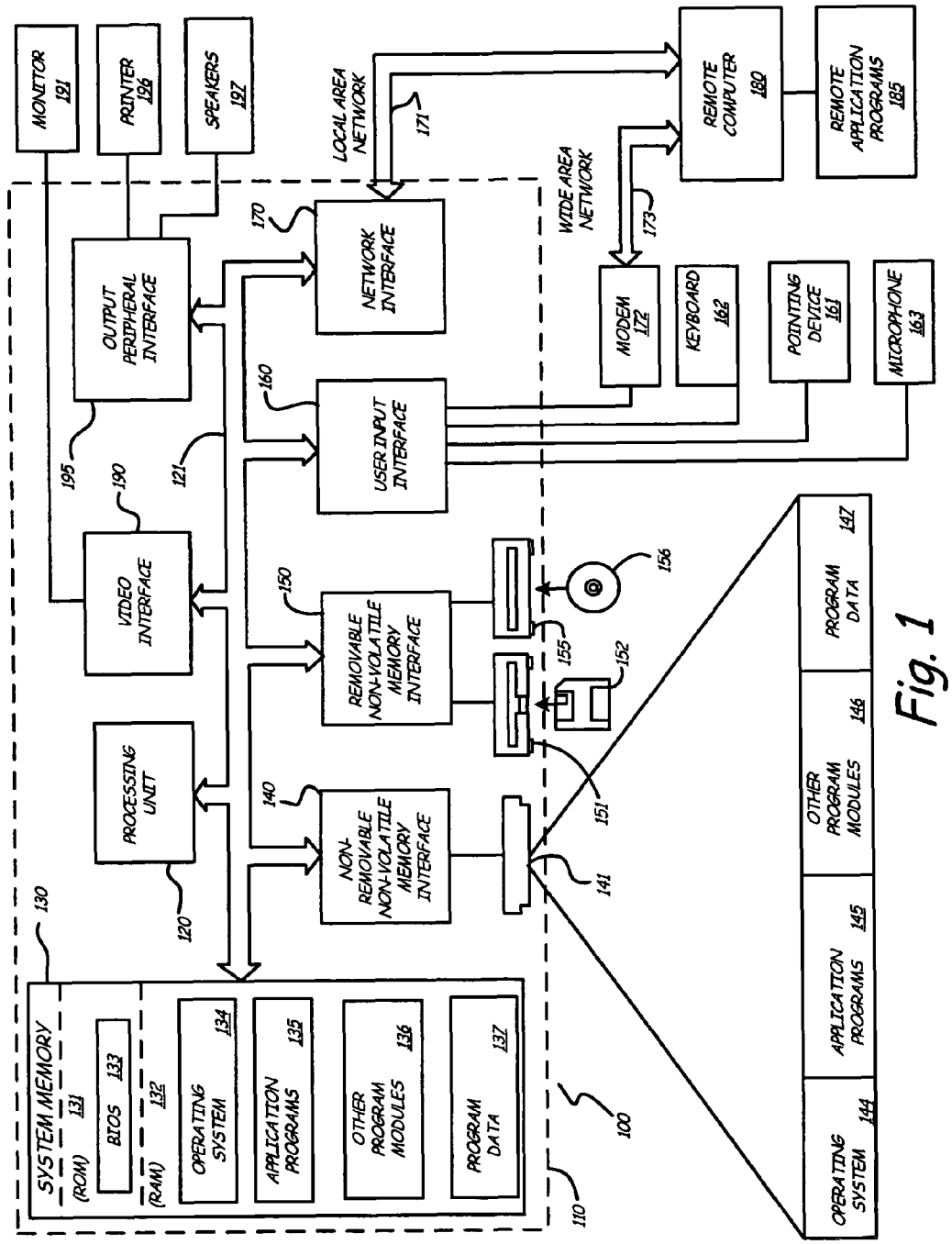
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100. In some embodiments, speech recognition such as command and control speech recognition is integrated into computing system environment 100

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
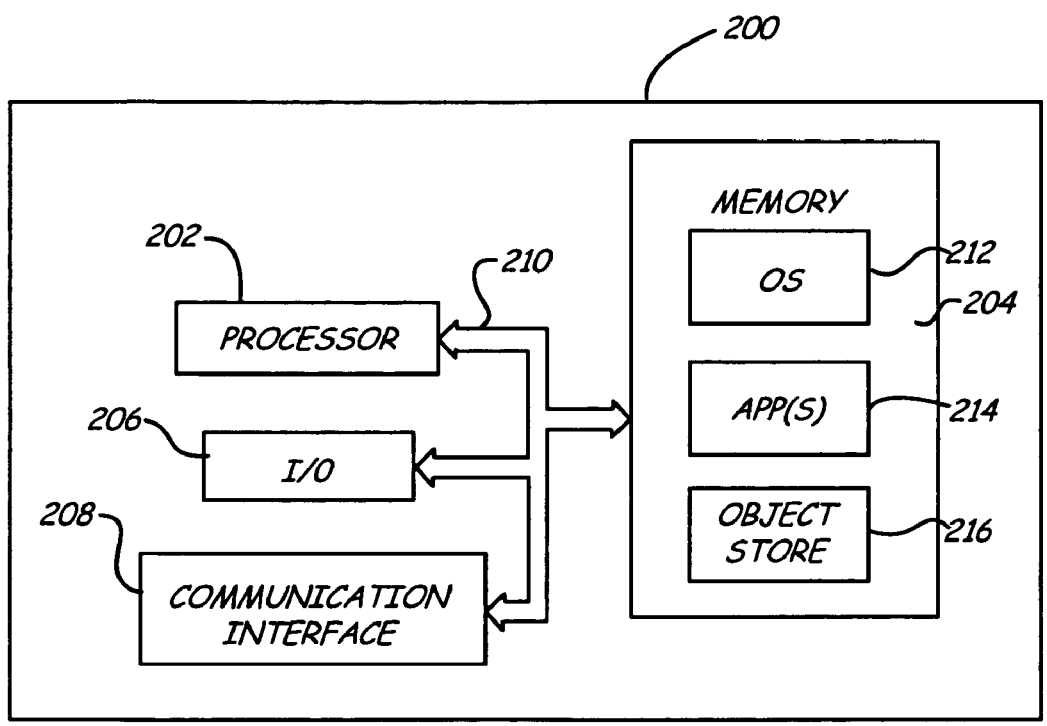
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210. In some embodiments, mobile device 200 is a mobile phone or multi-functional hand-held device that can support, for example, email, mobile telephone, text messaging, web-browsing, and/or other wireless information services. Examples of such devices include devices commonly known as a "pocket PC" or "smart phone."

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Word Posterior Probability in Speech Recognition

Word Posterior Probability (WPP) has often been used to measure confidence in speech recognition such as Large Vocabulary Continuous Speech Recognition (LVCSR).

Given a feature stream $o_1^T$ of observation from frame 1 to T, the posterior probability of a word $[w,s,t]$ with initial frame s and final frame t is:

$$p([w;s,t]|o_1^T) = \sum_{\substack{\forall I, [w';s',t']|_1^I, \\ \exists i, 1 \leq i \leq I, [w'_i;s'_i,t'_i]=[w,s,t]}} \frac{\prod_{n=1}^{I} p(o_{s'_n}^{t'_n}|w'_n)}{p(o_1^T)} \quad (1)$$

where $w=[w';s',t']|_1^I$ denote any legal word sequence with length I. The denominator representing the probability of observations can be calculated as follows:

$$p(o_1^T) = \sum_W p(o_1^T|W)p(W) \quad (2)$$

It is generally not possible to consider all possible word sequences. In most conventional LVCSR applications, a word graph G generated by the decoder with a beam-width is rich enough to contain many likely hypotheses. The acoustic probability values can then be approximated based on the word graph. Generally, WPP is calculated by considering all the hypotheses with the same word w identity and time overlapped with interval (s, t), because they can be regarded as reappearances:

$$p([w;s,t]|o_1^T) \approx \sum_{\substack{\forall I, [w';s',t']|_1^I \subseteq G, \\ \exists i, 1 \leq i \leq I, w'_i=w, (s'_i,t'_i) \cap (s,t) \neq \emptyset}} \frac{\prod_{n=1}^{I} p(o_{s'_n}^{t'_n}|w'_n)}{p(o_1^T)} \quad (3)$$

However, in many context free grammar (CFG) constrained applications, such as command and control speech recognition, the lexical and language model constraints can limit the number of hypotheses generated. As a result, WPP reliability can decrease. The concept can be explained from the viewpoint of N-best hypotheses. Given an utterance, let $W_1, W_2, \ldots, W_N$ represents the corresponding top N-best string hypotheses extracted from a word graph generated in a conventional speech recognition or LVCSR decoder. If N-grams in LVCSR are replaced by a stricter CFG grammar, some candidates in N-best list are eliminated. In many cases, we have $p(o_1^T) \approx p(o_1^T|W_1')p(W_1')$ and $p(W_1'|o_1^T) \approx 1$, so that the best path can become dominant and be scored with an artificially high WPP, even if the best path is incorrect. Hence, the WPP is generally less reliable for measuring confidence when word graphs are sparse.

To mitigate the unreliability caused by graph sparseness, it can be advantageous to (1) recover the string candidates eliminated by the stricter CFG decoding constraints or (2) refill the search space by appropriate hypotheses.

However, for many posterior probability calculations, the exact word sequences are generally unnecessary. It is generally enough to obtain those pronunciation sequences that approximate the input utterance in the dynamic HMM space. Put another way, qualified competitors for the dominating path can be used to introduce additional nodes to a "lattice."

To do so, generalized background models can be introduced in the decoder where N-grams at the background model level can be considered.

Since CFG is used to constrain decoding results, a background model looping in a background decoding module or separate a background decoder can be used to generate additional qualified competitors or hypotheses. The graph or network generated by the background decoder can be called a background model graph or network. Based on this background model graph, the Model-based Posterior Probability (MPP) can be calculated for measuring confidence. A conventional decoder and another background module or decoder, as mentioned above, directed by a free background model loop can thus be used to assist in measuring confidence.

Figure 3:
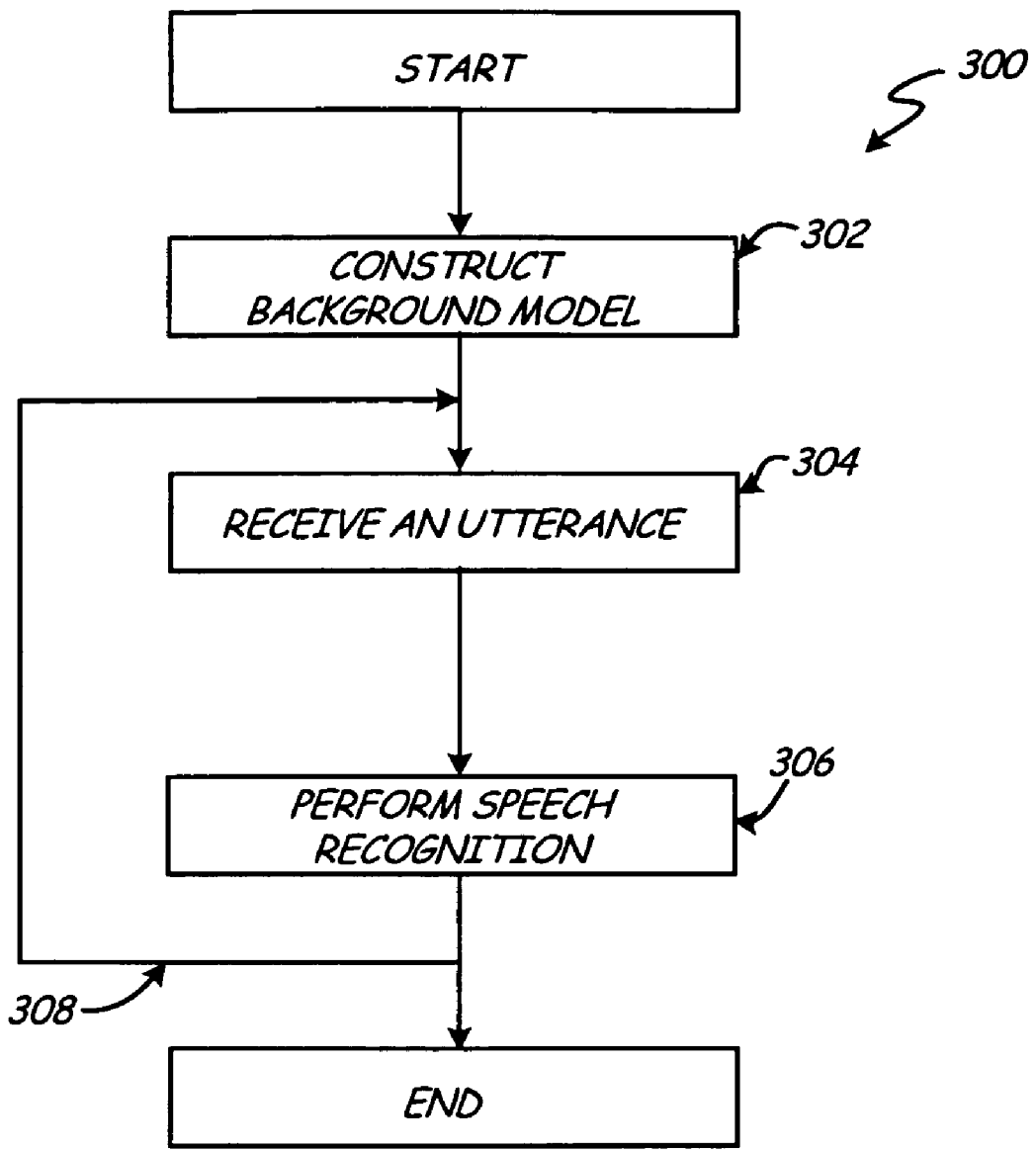
FIG. 3 is a block diagram illustrating broad steps of constructing one or more background model for use in speech recognition.
Figure 4:
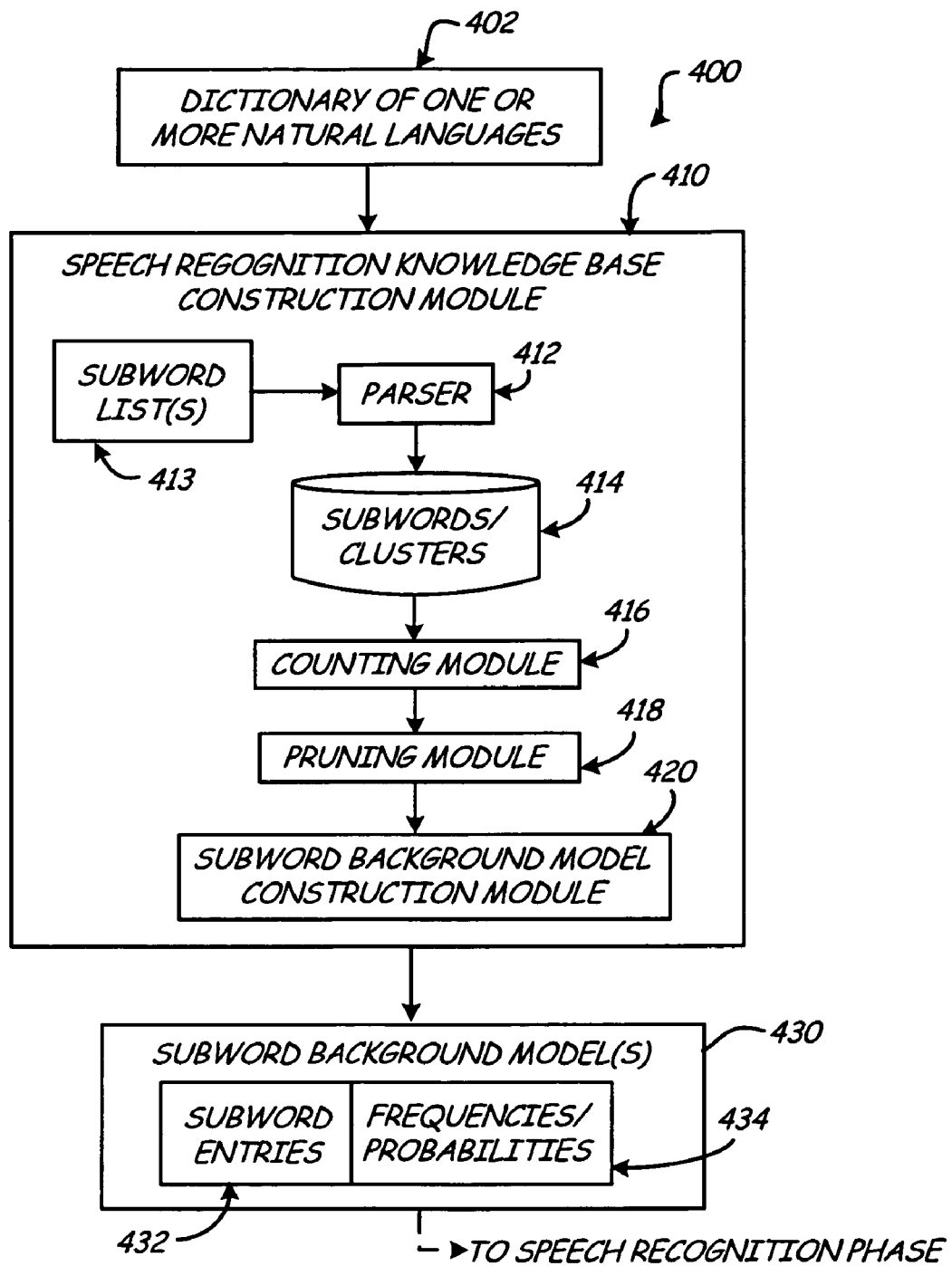
FIG. 4 is a block diagram illustrating construction of one or more background models.
Figure 5:
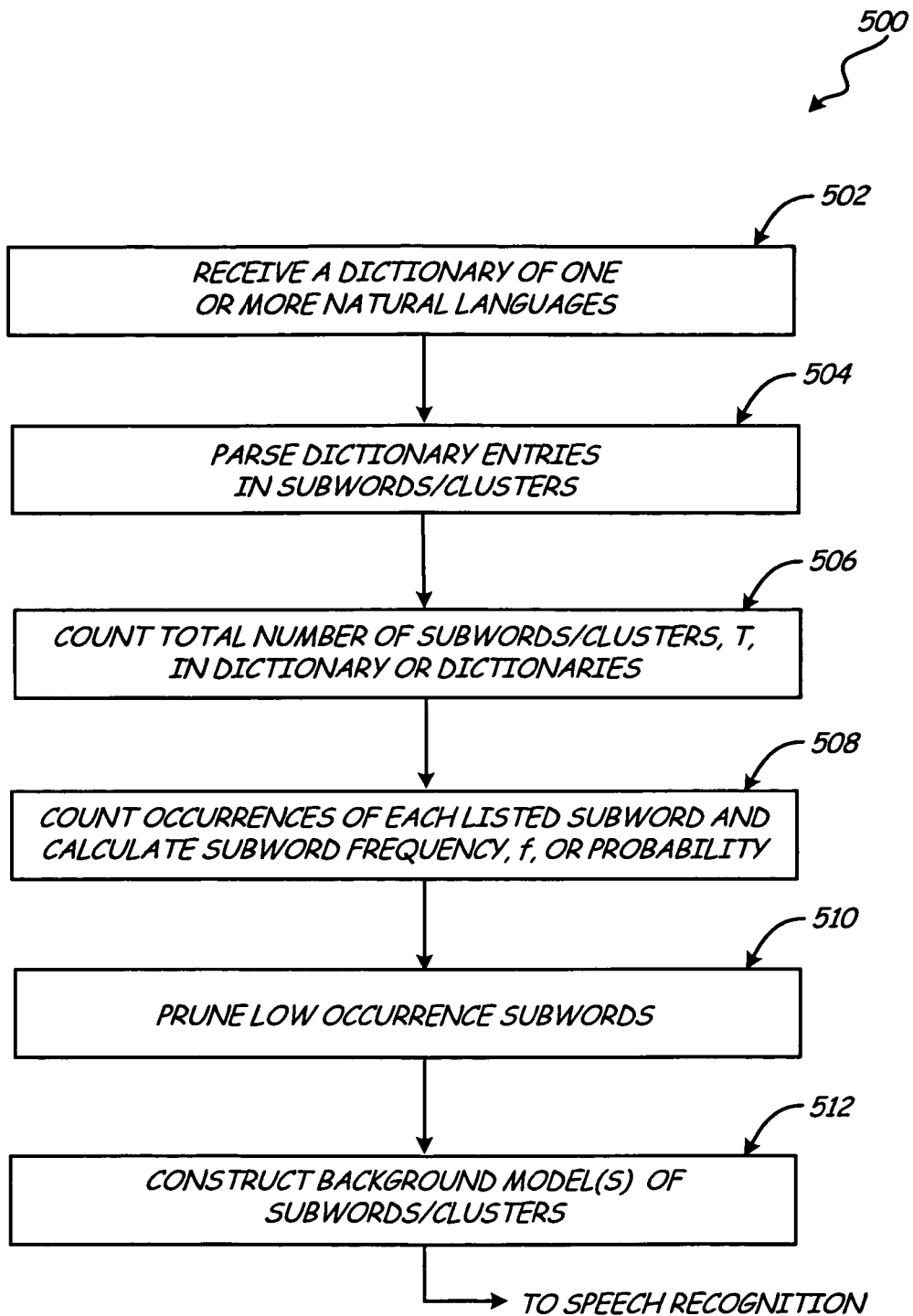
FIG. 5 illustrates steps of constructing the one or more background models in accordance with FIG. 4.

Returning to the figures, FIG. 3 illustrates method 300 comprising broad step 302 of constructing one or more background models or subword background models and step 306 of performing speech recognition on a user utterance received at step 304 using the one or more background models constructed in step 302. In many embodiments, step 306 can include command and control speech recognition and be performed any number of times as illustrated by reference 308. FIGS. 4 and 5 illustrate modules and steps for performing step 302 illustrated in FIG. 3. Similarly, FIGS. 6 and 7 include modules and steps for performing step 306. It is noted that the modules and steps are exemplary only and can be combined, divided, reordered, etc. as desired as is generally known by those skilled in the art.

One approach is to use another LVCSR decoder to generate a separate word graph or network. However, this option can be computationally expensive and impractical. Instead, it can be advantageous to select a smaller subword unit, such as a syllable or phoneme in constructing a background model. The background model would then be accessed during decoding to generate a separate network or to enlarge the network of the conventional decoder.

Criteria for selecting appropriate subword units include, for example, (1) the subword unit should characterize the utterance in HMM space relatively well and (2) the selected subword unit should allow unambiguous decomposition of word sequences into a sequence of model units. Accordingly, some subword units have been adopted as exact models rather than ordinary general filler models. Various candidate model sets have been considered including phonemes and syllables in both English and Chinese.

Phoneme and Syllable Subword Background Models

There are approximately 40 phonemes in English and around 70 toneless syllable initials and finals in Chinese. Therefore, these types of subword units can be appropriate choices for subword-based background model sets. It is natural to use syllables in background models in syllable-based languages like Chinese where there are only slightly over 400 syllables in the whole inventory. However, for English, the number of syllables exceeds 15,000, which would be a cumbersome number to use in a background model loop.

To reduce the number of English syllables to model, it is possible to cluster similar syllables to generate a smaller syllable set or prune syllables with lower frequencies. For example, syllable clusters can be formed with similar consonants such as /b/ and /p/; /g/ and /k/; /d/ and /t/; /z/ and /s/; and /v/γ/f/ while leaving vowels intact. Also, syllable frequency can be calculated with a large dictionary and frequency count then used to prune out syllables having low frequency.

FIG. 4 illustrates module or system 400, which constructs one or more background models from subword units such as phonemes or syllables for later use in speech recognition. FIG. 5 illustrates method 500 comprising steps for constructing one or more background models in accordance with FIG. 4. At step 502, speech recognition knowledge base construction module 410 receives or accesses dictionary 402 of one or more natural languages. The natural language can be any natural language, such as English or Chinese. Dictionary 402 can be of any size.

In some embodiments, dictionary 402 is from one language and is used to construct a subword background model for later use in monolingual speech recognition. In other embodiments, dictionary 402 comprises two or more dictionaries from different natural languages that are used to construct two or more background models for later use in bilingual or multilingual speech recognition. In still other embodiments, dictionary 402 can be a bilingual Chinese-English or English-Chinese dictionary.

One example of bilingual speech recognition is a situation where a user's utterance is partly in one language and partly in another language. For example, because English words have been introduced into Chinese-speaking countries, Chinese speakers have been known to mix English and Chinese words in their speech. Thus, in command and control speech recognition, such as used in automatic dialing on mobile phones, a Chinese-speaking person could use an English command word such as "Call" followed by person's name or another object spoken in Chinese. For example, a user could speak the utterance "Call Bi-er-gai-ci" which means "Call Bill Gates" in English.

At step 504, parser 412 parses dictionary or dictionaries 402 into individual subwords or clusters 514. In most cases, subword list 413 is accesses or received to perform the parsing. In some embodiments a list of English phonemes is provided. In other embodiments, a list of Chinese syllables is provided. In one embodiment, an English list of phonemes and a Chinese list of syllables is provided for use in parsing both English and Chinese dictionaries for later use in bilingual speech recognition.

At step 506, counting module 416 receives parsed subwords or clusters 414 and counts the total number, T, of subwords or clusters 414 in dictionary 402. At step 508, counting module 516 counts the number of occurrences of each listed subword on subword list 413 and calculates frequency f or probability of each listed subword. At step 510, optional pruning module prunes low frequency subwords from subword list 413. At step 512, subword background model 430 is constructed and stored for later use in speech recognition. In some embodiments, subword background model 430 is a database comprising subword entries 432 and corresponding frequencies, probabilities, or normalized probabilities 434

It is noted that background model 430 can further include N-gram probabilities. However, in most embodiments background model 430 includes only a free subword loop.

Speech Recognition Phase

Figure 6:
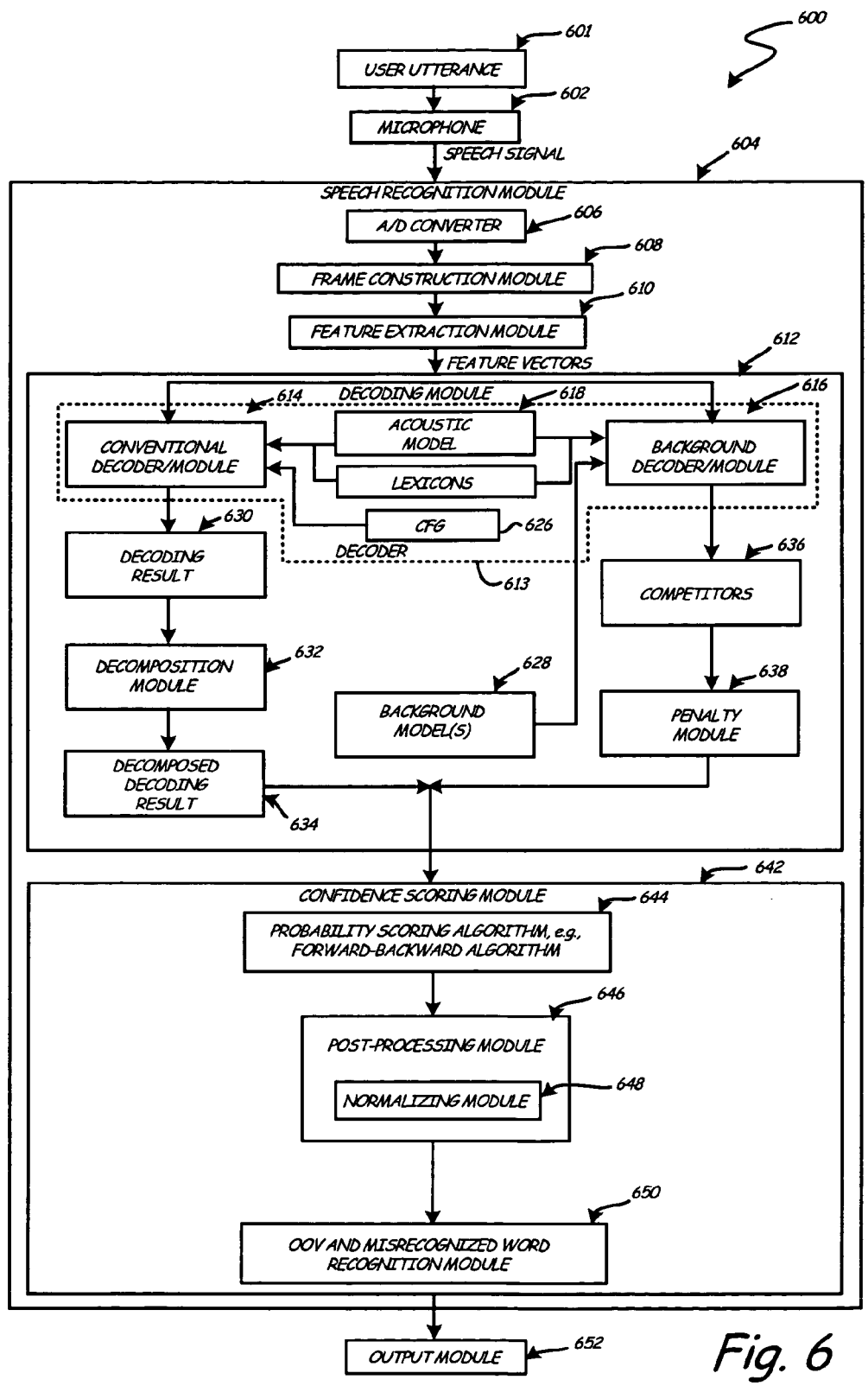
FIG. 6 illustrates a block diagram of speech recognition using one or more background models.
Figure 7:
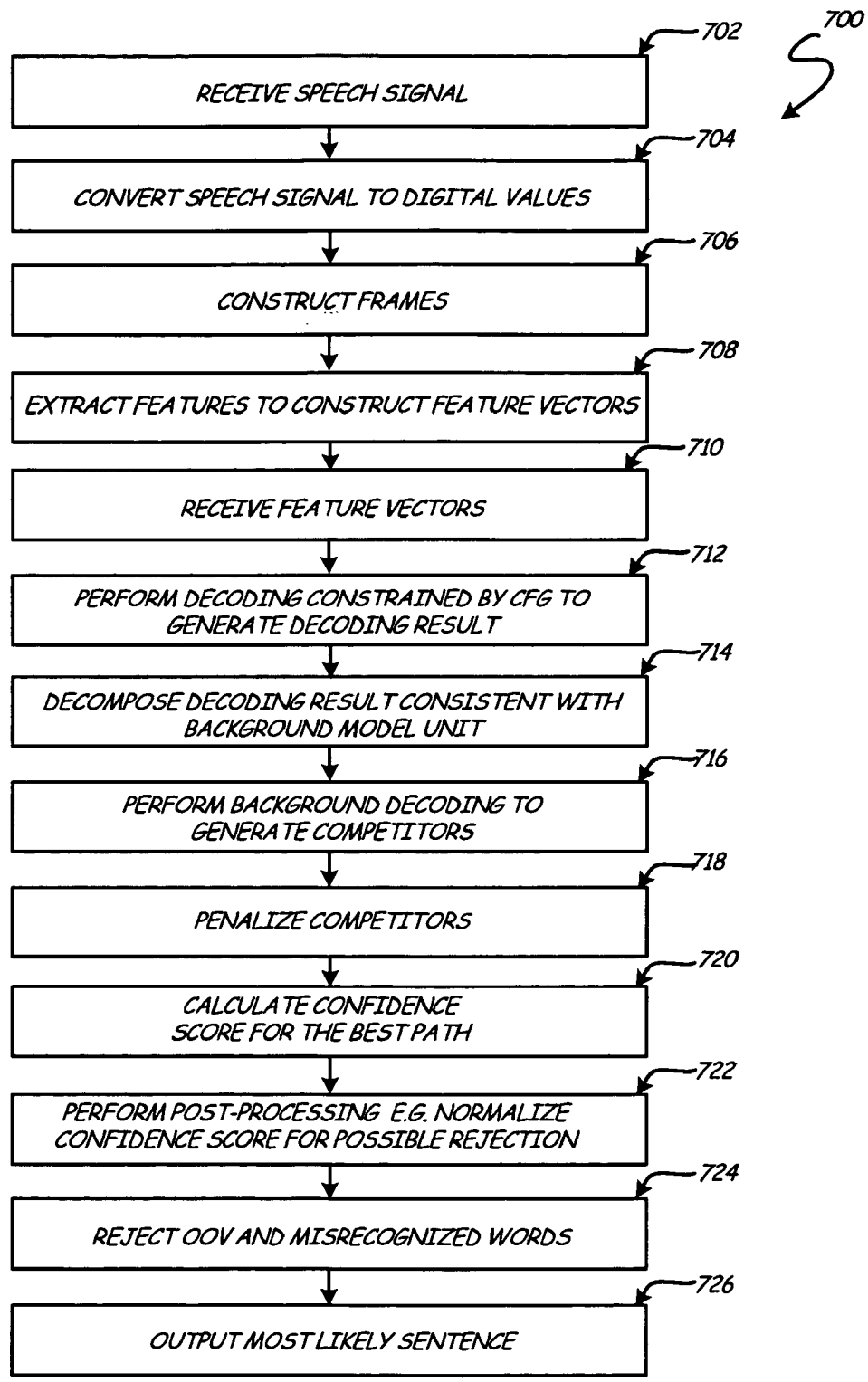
FIG. 7 illustrates steps of recognizing speech using the one or more background models in accordance with FIG. 6.

FIG. 6 illustrates system or module 600, which accesses or receives one or more background models, typically subword background models to perform speech recognition, such as command and control speech recognition. FIG. 7 illustrates method 700 comprising steps for performing speech recognition is accordance with FIG. 6.

At step 702, speech recognition module 604 receives an electrical or speech signal associated with a user's audible words or utterance. Typically, a user audibly speaks utterance 601 into microphone 602, if necessary, which converts utterance 601 into an electrical or speech signal. In most embodiments, utterance 601 comprises words associated with command and control speech recognition described above.

At step 704, analog-to-digital or A/D converter 606 converts the received electrical signal into a series of digital values. In several embodiments, A/D converter 606 samples an analog speech signal at 16 kHz and 16 bits per sample thereby creating 32 kilobytes of speech data per second.

At step 706, frame construction module 608 receives digital data or values provided by A/D converter 606. Frame construction module 608 groups the digital values into frames of values. In one embodiment, each frame is 25 milliseconds long and begins 10 milliseconds after the beginning of the previous frame.

At step 708, the frames of digital data or values are received by feature extraction module 610, which extracts at least one feature from the digital signal to construct or produce at least one feature vector. Types of feature extraction modules include modules for performing Linear Predictive Coding (LPC), LPC derived cepstrum, Perceptive Linear Prediction (PLP), Auditory model feature extraction, and Mel-Frequency Cepstrum Coefficients. (MFCC) feature extraction. In many embodiments, feature extraction module 610 performs MFCC feature extraction. However, it is noted that other embodiments are not limited to the above mentioned types of feature extraction.

Feature extraction module 610 can produce feature vectors comprising a single multi-dimensional feature vector per frame. The number of dimensions or values in the feature vector is dependent upon the type of feature extraction that is used. For example, mel-frequency cepstrum coefficient or MFCC vectors generally have 12 coefficients plus a coefficient representing power for a total of 13 dimensions. In one embodiment, a feature vector is computed from the mel-coefficients by taking the first and second derivative of the mel-frequency coefficients plus power with respect to time. Thus, for such feature vectors, each frame is associated with 39 values that form the feature vector.

At step 710, feature vectors produced by feature extraction module 610 are received by decoding module 612. Decoding module 612 comprises conventional decoder or module 614 and background decoder or module 616. Conventional decoder 614 and background decoder 616 can be separate decoders or modules of the same decoder, as desired.

At step 712, conventional decoder 614 generates decoding result 630 based at least on the stream of feature vectors and CFG 626. Decoding result 632 generally comprises sequences of linguistic units, e.g. word sequences, where the sequences and number of sequences in decoding result 630 are constrained by CFG 626. A best word sequence of I words can have the notation $W=[w,\tau,t]|_1^I$. It is noted that the size of the linguistic units in decoding result 632 can be different for different embodiments. For example, the linguistic units can be entire words, or parts of words such as senones, phonemes, diphones, triphones, or syllables.

In most embodiments, CFG 626 is constructed using words associated with command and control speech recognition. CFG 626 can be constructed with all legal phrases arranged in parallel. In some embodiments, CFG 626 is bilingual in that legal phrases include words or linguistic units in more that one language. For example, CFG 626 can be constructed with English command words such as "Call" and Chinese names having two or three syllables.

Conventional decoder 614 can also access acoustic model 618, and one or more lexicons 622, such as a system lexicon, an application lexicon, or a user lexicon, if any, to aid in decoding. In many embodiments, acoustic model 618 is a Hidden Markov Model or HMM consisting of a set of hidden states, with one state per frame of the input signal. Each state has an associated set of probability distributions that describe the likelihood of an input feature vector matching a particular state. In some embodiments, a mixture of probabilities (typically 10 Gaussian probabilities) is associated with each state. The Hidden Markov Model also includes probabilities for transitioning between two neighboring model states as well as allowed transitions between states for particular words or linguistic units.

A system lexicon consists of a list of linguistic units (typically words or syllables) that are valid for a particular natural language. Conventional decoder 614 can use a system lexicon to limit its search for possible linguistic units to those that are actually part of the language. A system lexicon typically includes pronunciation information (i.e. mappings from each linguistic unit to a sequence of acoustic units used by acoustic model 618. Optional application lexicon is similar to a system lexicon, except an application lexicon contains linguistic units that are added by a particular application while a system lexicon contains linguistic units that were provided with the speech recognition system. An optional user lexicon is also similar to a system lexicon, except a user lexicon contains linguistic units that have been added by the user.

At step 714, decomposition module 632 decomposes decoding result 630 to generate decomposed decoding result 634. The decomposition includes sequences of linguistic units that are consistent with the word or subword unit selected for background model 628. Thus, if background model 628 models syllables or phonemes, then decomposition module 632 also decomposes sequences in decoding result 630 into syllables or phonemes, respectively.

At step 716, background decoder or module applies one or more background models 628 on the generated sequences of linguistic units to generate a list of qualified competitors or alternative sequences 636, which can be expressed as $m_1, m_2, \ldots, m_Q$. Background decoding can function as a word list loop, subword loop, phoneme loop, and so on. Competitors or alternative sequences 636, can have the notation $M=[m,\tau,t]|_1^J$, where U is the model sequence length.

It is noted that decoder 613 is illustrated as a dotted line encompassing both conventional decoder 614 and background decoder 616. Decoder 613 is illustrated to indicate that the decoding process can occur in a single decoder that can access CFG 626 and background model 628 or with two separate decoders 614, 616 or decoding paths.

At step 718, penalty module 638 penalizes competitors 636 because the background model graph or network is generally given less weight than the conventional decoding network. In many embodiments, for each arc in the background model graph, a penalty is imposed as follows:

$$\log p'(o_\tau^t|m) = \log p(o_\tau^t|m) - \text{penalty} \cdot (t-\tau+1) \quad (4)$$

At step 720, confidence measure module 642 applies probability-scoring algorithm 644 to calculate model-based posterior probabilities or MPP of the best path through a lattice constructed from competitors 636 and decomposed decoding result 634. In many embodiments, probability-scoring algorithm 644 is a Forward-backward algorithm. However, other probability scoring algorithms can be used, such as a Maximum Aposteriori Probability (MAP) algorithm, a Forward algorithm, or a Viterbi algorithm.

At step 722, post-processing module 646 comprising optional normalizing module 648 normalizes MPP scores by the total number of J, to facilitate a universal threshold for rejection:

$$p(M \mid o_1^T) = \left\{ \prod_{j=1}^{J} p([m_j; s_j, t_j] \mid o_1^T) \right\}^{\frac{1}{J}} \quad (5)$$

At step 724, OOV and misrecognized word rejection module compares MPP scores of one or more highest scoring sequences or paths with a selected threshold value. Sequences or paths having WPP scores that do not meet the threshold value are rejected as possible or probable OOV or misrecognized words.

At step 726, output module 652 receives one or more most likely sequences. Output module 652 can handle overhead associated with transmitting the output sequence to a larger computing environment or one or more applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium including instructions readable by a computer which, when implemented comprise:
   receiving a speech-based signal;
   generating a decoder result comprising at least one sequence of linguistic units based on applying a context free grammar to the speech-based signal;
   decomposing the decoder result into a decomposed decoder result comprising at least one sequence of subword elements;
   accessing a background model having probabilities of subword elements in one or more natural language;
   generating competitive sequences using the decomposed decoder result and the background model; and
   calculating a confidence measure using the competitive sequences and the decomposed decoding result by calculating a model based posterior probability score using the decomposed decoding result and the competitive sequences.

2. The computer readable storage medium of claim 1, wherein the subword elements are one of phonemes, syllables, senones, diphones, or triphones.

3. The computer readable storage medium of claim 1, wherein generating competitive sequences comprises applying a bilingual or multilingual background model comprising probabilities of subword elements in two or more dictionaries of natural languages.

4. The computer readable storage medium of claim 1, wherein calculating model based posterior probability score comprises applying a forward-backward algorithm to calculate the score.

5. A method for performing speech recognition comprising:
   receiving a speech based signal based on words spoken in one or more natural languages;
   applying a context free grammar to the speech based signal with a decoder implemented by a processor to generate a decoding result that identifies speech recognized by the decoder in the speech based signal;
   decomposing the decoding result into subword linguistic units consistent with subword units of a background model to obtain a decomposed decoding result;
   generating competitive sequences using the decomposed decoding result and the background model, the competitive sequences being sequences of alternative subword linguistic units that are alternatives to the decomposed decoding result, the background model comprising probabilities of subword units in a dictionary of the one or more natural languages; and
   calculating a model based posterior probability score for a given combination of subword linguistic units by considering both the decomposed decoding result and the competitive sequences.

6. The method of claim 5 wherein generating comprises:
   constructing a lattice for each of the competitive sequences.

7. The method of claim 6, and further comprising calculating a penalty score for each of the competitive sequences, the penalty score based on connections of the lattice.

8. The method of claim 6, and further comprising calculating a confidence score using the model based posterior probability score.

9. The method of claim 8, and further comprising:
   normalizing the confidence score; and
   rejecting a sequence when the confidence score is less than a selected threshold.

10. A system for performing speech recognition comprising:
    a processor;
    a decoder or decoding module executable on the processor comprising:
      a decoder or module that generates a decoder result comprising a sequence of words;
      a decomposition module that decomposes the sequence of words into a decomposed decoder result comprising a sequence of subword linguistic units;
      a background decoder or module that uses a background model of subword linguistic units to generate competitive sequences of subword linguistic units, based on the decoder result;
      a module that calculates a model based posterior probability score for at least one given path of subword units through a network of subword units that comprises using the decomposed decoding result and the competitive sequences; and
    an output module executable on the processor that provides an indication of correctness of the decoder result, the indication of correctness being based on the model based posterior probability score and being used as a rejection threshold for rejecting hypothesis decoder results to identify a correct decoder result.

* * * * *